US008224109B2

(12) United States Patent
Bosco et al.

(10) Patent No.: US 8,224,109 B2
(45) Date of Patent: Jul. 17, 2012

(54) METHOD AND RELATIVE DEVICE FOR ESTIMATING WHITE GAUSSIAN NOISE THAT CORRUPTS A DIGITAL IMAGE

(75) Inventors: Angelo Bosco, Giarre (IT); Arcangelo Ranieri Bruna, San Cataldo (IT); Stewart Gresty Smith, Haddington (GB)

(73) Assignees: STMicroelectronics S.r.l., Agrate Brianza (IT); STMicroelectronics (Research & Development) Ltd., Buckinghamshire (GB)

(*) Notice: Subject to any disclaimer, the term of this patent is extended or adjusted under 35 U.S.C. 154(b) by 1258 days.

(21) Appl. No.: 11/868,358

(22) Filed: Oct. 5, 2007

(65) Prior Publication Data

US 2008/0085060 A1    Apr. 10, 2008

(30) Foreign Application Priority Data

Oct. 6, 2006  (IT) .............................. VA2006A0060

(51) Int. Cl.
*G06K 9/20* (2006.01)
*G06K 9/36* (2006.01)
*G06K 9/40* (2006.01)
*G06K 9/62* (2006.01)
*G06K 9/66* (2006.01)
*G06K 9/46* (2006.01)
*G06K 9/34* (2006.01)
*G06T 5/00* (2006.01)
*H04N 1/407* (2006.01)
*H04N 1/409* (2006.01)
*H04N 1/38* (2006.01)
*H04N 5/217* (2006.01)
*H04N 5/00* (2006.01)
*H04N 5/228* (2006.01)

(52) U.S. Cl. ........ 382/260; 382/173; 382/195; 382/224; 382/254; 382/282; 358/3.26; 358/463; 348/222.1; 348/241; 348/606; 348/607

(58) Field of Classification Search .................. 382/162, 382/168, 173, 181, 190, 195, 254–255, 260–261, 382/270, 275, 276, 282–284; 348/222.1, 348/268–280, 241, 606, 607; 358/3.26, 518, 358/530, 463

See application file for complete search history.

(56) References Cited

U.S. PATENT DOCUMENTS

| 5,671,264 | A | * | 9/1997 | Florent et al. | 378/98 |
| 5,684,888 | A | * | 11/1997 | Vuylsteke | 382/128 |
| 5,799,111 | A | * | 8/1998 | Guissin | 382/254 |
| 6,970,605 | B1 | * | 11/2005 | Kondo et al. | 382/254 |

(Continued)

OTHER PUBLICATIONS

Bosco, A.; Bruna, A.; Messina, G.; Spampinato, G.; , "Fast method for noise level estimation and integrated noise reduction," Consumer Electronics, IEEE Transactions on , vol. 51, No. 3, pp. 1028-1033, Aug. 2005 doi: 10.1109/TCE.2005.1510518.*

(Continued)

*Primary Examiner* — Anand Bhatnagar
*Assistant Examiner* — Nathan Bloom
(74) *Attorney, Agent, or Firm* — Seed IP Law Group PLLC

(57) ABSTRACT

A method for estimating the white Gaussian noise level that corrupts a digital image by discriminating homogeneous blocks from blocks containing a textured area and skipping these last blocks when evaluating the noise standard deviation.

26 Claims, 6 Drawing Sheets

U.S. PATENT DOCUMENTS

| | | | | |
|---|---|---|---|---|
| 6,972,868 | B1* | 12/2005 | Gondek et al. | 358/1.9 |
| 7,139,035 | B2* | 11/2006 | Kempf | 348/607 |
| 7,792,381 | B2* | 9/2010 | Rhee | 382/260 |
| 2003/0161497 | A1* | 8/2003 | Vuylsteke | 382/100 |
| 2004/0119861 | A1* | 6/2004 | Bosco et al. | 348/272 |
| 2004/0125236 | A1* | 7/2004 | Kempf | 348/700 |
| 2006/0147113 | A1* | 7/2006 | Han | 382/171 |
| 2008/0205786 | A1* | 8/2008 | Young et al. | 382/261 |
| 2009/0116762 | A1* | 5/2009 | Lin | 382/261 |
| 2009/0324121 | A1* | 12/2009 | Bhagavathy et al. | 382/260 |

OTHER PUBLICATIONS

A. Bosco, S. Battiato, M. Mancuso, G. Spampinato, Adaptive Temporal Filtering for CFA Video Sequences, In Proceedings of IEEE ACIVS 2002, pp. 19-24—Ghent, Belgium, Sep. 2002.*

Bosco, A.; Bruna, A.; Smith, S.; Tomaselli, V.; , "Fast Noise Level Estimation using a Convergent Multiframe Approach," Image Processing, 2006 IEEE International Conference on , vol., No., pp. 2621-2624, Oct. 8-11, 2006 doi: 10.1109/ICIP.2006.313047.*

Battiato, S.; Bosco, A.; Castorina, A.; Messina, G. Automatic Image Enhancement by Content Dependent Exposure Correction. EURASIP J. Appl. Signal Process. 2004, 2004, 1849-1860.*

Bosco, A.; Findlater K.; Battiato, S.; Castorina A. Noise Reduction Filter for Full-Frame Imaging Devices. IEEE Trans. Consum. Electron. 2003, 49, 676-682.*

Russo, F. Technique for Image Denoising Based on Adaptive Piecewise Linear Filters and Automatic Parameter Tuning. IEEE Trans. Instrum. Meas. 2006, 55, 1362-1367.*

Amer, A. et al., "Fast and Reliable Structure-Oriented Video Noise Estimation," IEEE Transactions on Circuits and Systems for Video Technology, 15(1):113-118, Jan. 2005.

Russo, F., "A Method for Estimation and Filtering of Gaussian Noise in Images," IEEE Transactions on Instrumentation and Measurement, 52(4):1148-1154, Aug. 2003.

Shin, D.-H., "Block-Based Noise Estimation Using Adaptive Gaussian Filtering," IEEE Transactions on Consumer Electronics, 51(1):218-226, Feb. 2005.

* cited by examiner

METHOD AND RELATIVE DEVICE FOR ESTIMATING WHITE GAUSSIAN NOISE THAT CORRUPTS A DIGITAL IMAGE

BACKGROUND

1. Technical Field

This disclosure relates in general to algorithms for filtering digital images and more particularly to a method and to an implementing device for estimating white Gaussian noise that corrupts a digital image.

2. Description of the Related Art

Pixel intensity fluctuations in homogeneous area of digital images are mainly due to random noise. For this reason, these areas are analyzed for obtaining noise statistic figures. Examples of methods for estimating noise are disclosed in A. Amer, E. Dubois, "Fast and Reliable Structure-Oriented Video Noise Estimation," IEEE Transactions on Circuits and Systems for Video Technology, Vol. 15, No 1 (January 2005), and D-H. Shin, R-H Park, S. Yang, J-H Jung, "Block-Based Noise Estimation Using Adaptive Gaussian Filtering," IEEE Transactions on Consumer Electronics, Vol. 51, No. 1 (February 2005).

A typical approach for estimating noise standard deviations consists in subdividing the image in non-overlapped blocks. Noise standard deviations are calculated by processing pixel values in homogeneous blocks and finally noise levels are estimated in function of all the measured local variances.

Another technique consists in pre-filtering an image A acquired using a low-pass filter. This operation generates a filtered image $A_S$ that is subtracted by the original noisy image A, thus the noise image is given by the following equation:

$$\tilde{\eta}(i,j) = A(i,j) - A_S(i,j)$$

wherein $\tilde{\eta}$ is used for estimating the noise standard deviation $\tilde{\sigma}$.

Another nonlinear method that carries out the step of estimating the parameter $\tilde{\sigma}$ by using temporally adjacent frames of an image sequence, is described in F. Russo, "A Method for Estimation and Filtering of Gaussian Noise in Images," IEEE Transactions on Instrumentation and Measurement, Vol. 52, No. 4 (August 2003).

Algorithms for eliminating noise from digital images use estimations of noise levels such to adjust the characteristics of the filtering. Routines for estimating the noise level should be fast and reliable in order to have filtering devices of digital images with good performances. With a fast evaluation of the noise level it is possible to obtain a faster filtering system, and a reliable estimation allows the filtering system to adjust lightening conditions and image characteristics.

Generally, it is supposed that images to be processed are corrupted by additive white Gaussian noise (AWGN), that is:
  i) noise is additive: a random value is added to each pixel;
  ii) noise is white: noise level in a pixel does not depend from the noise level in any other pixel;
  iii) noise is Gaussian: noise intensity values are distributed according to a Gaussian distribution.

The Probability Density Function (PDF) is:

$$f(x) = \frac{1}{\sigma\sqrt{2\pi}} e^{-\frac{(x-\mu)^2}{2\sigma^2}}$$

wherein $\mu$ and $\sigma$ are the mean and the standard deviation of the distribution, respectively.

The hypothesis of additive white Gaussian noise (AWGN) is done because by adding independent signals with different PDFs a signal with a Gaussian PDF is generated. Another classic hypothesis in digital image processing consists in considering a zero mean AWGN.

The main parameter to be estimated for determining the zero mean AWGN noise level is the variance of the standard deviation of the error distribution.

The image to be processed is subdivided in non-overlapped blocks of fixed size and the standard deviation for each block is calculated. Let us suppose that the smallest standard deviations be present in homogeneous blocks in which the pixel variations are due practically only to random noise.

Given a set of n normally distributed independent stochastic variables, a non-biased estimator of the variance is:

$$S^2 = \frac{1}{n-1} \sum_{i=1}^{n} (X_i - \overline{X})^2$$

wherein $\overline{X}$ is the mean. If $X_i$ are noise samples, then $E(S^2) = \sigma^2$, that is the expected value of $S^2$ is the noise variance that is to be estimated.

Calculating $S^2$ requires numerous operations, that must be repeated for each pixel belonging to the homogeneous area as long as a sufficient amount of samples has been collected.

Substantially, in order to estimate the local standard deviation for each pixel of a homogeneous region by using the above described approach, the following operations are performed:
  i) carrying out the calculations required by a texture analyzer for determining a texture-degree, that gives the information about the texture of the image represented in the image portion being processed;
  ii) estimating the mean value of the pixel intensity of the working window of the filter which the current pixel belongs to;
  iii) adding the squares of the differences between each pixel of the mask and the mean value;
  iv) dividing by n−1;
  v) averaging on all local variances;
  vi) extracting the square root of the final variance for obtaining the standard deviation.

The above known algorithm requires a considerably large number of calculations and as a consequence it is relatively time consuming.

BRIEF SUMMARY OF THE INVENTION

In an embodiment, a method for estimating the white Gaussian noise level that corrupts a digital image that is accurate and much faster than known methods has been found.

Differently from known methods, an embodiment of the method does not need to obtain an image of the noise that corrupts an ideal image, and may quickly calculate the standard deviation of the white Gaussian noise by processing directly the noise corrupted image as captured by the sensors. The method discriminates homogeneous blocks from blocks containing a textured area and skips these last blocks for evaluating the noise standard deviation. This may be done because the standard deviation of intensity of pixels of textured areas are likely to have a much larger standard deviation than that of the noise that corrupts the image to be filtered.

More precisely, the image is split in blocks to be processed and for each block a maximum value of the standard deviation of the difference among the pixels of the block is established. Then for each pixel a working window centered thereon is considered and the absolute values of the differences between the intensity of the central pixel of the working window and of the other pixels of the window are evaluated.

In case of Bayer images, only pixels of the same color of the central pixel of the working window may be considered for calculating absolute values of the differences.

In one embodiment, if the calculated absolute values are all smaller than a threshold in function of the maximum value of the standard deviation, then the current working window is treated as containing pixels that belong to a homogeneous region. The threshold may be pre-determined, adjustable, or a function. If at least one of these differences is larger than the threshold, the working window is treated as a non-homogeneous region and thus the pixel is not considered for estimating the standard deviation of the noise. Thereafter, a working window centered on the next pixel may be evaluated.

The distribution of the absolute values of the differences of pixel intensities belonging to homogeneous regions is stored and is processed for calculating the noise standard deviation.

According to an embodiment of the method, the standard deviation for the current block is the value larger than 68% of the stored absolute values.

Once an estimation of the standard deviation for the first block has been obtained, the maximum value of the standard deviation for the next block to be processed in function of the obtained value for the just processed block is established.

In some embodiments, the maximum value of the standard deviation is the same for all blocks of a same image.

In one embodiment, a method of automatically estimating white Gaussian noise that corrupts a digital image comprises (a) subdividing the image to be processed in blocks, (b) determining a maximum standard deviation of absolute values of differences among pixels of a block, (c) for each pixel of the block, performing the steps of: calculating absolute values of differences of intensities between the pixel and homogeneous pixels contained in a working window centered on the pixel; comparing the absolute values of differences with a threshold based on the maximum standard deviation of the block; and classifying the pixel as belonging to a homogeneous portion of the image if the absolute values of the differences are all smaller than the threshold, (d) determining a standard deviation of noise for the block based on pixels classified as belonging to homogeneous portions of the image; (e) setting a maximum standard deviation of differences between pixels for a successive block to be processed, and repeating c-d for a successive block. In one embodiment, setting the maximum standard deviation of the successive block to be processed comprises setting the maximum standard deviation for the successive block equal to the maximum standard deviation of the previous block. In one embodiment, setting the maximum standard deviation for the successive block to be processed comprises multiplying the standard deviation established at point d) for the previous block by a square root of 2. In one embodiment, step d) comprises: storing the absolute values of the differences in respect to the pixel; and estimating the noise standard deviation on the block as a standard deviation of the stored absolute values divided by a square root of two. In one embodiment, step d) comprises: establishing at least a lower threshold $\sigma_0$ and an upper threshold $\sigma_1$; comparing the absolute value of each of said differences with the lower threshold $\sigma_1$ and the upper threshold $\sigma_1$; counting a number of absolute values of said differences that do not exceed said lower threshold; counting a number of absolute values of said differences that do not exceed said upper threshold; counting a number of absolute values of said differences that do not exceed said maximum standard deviation; and estimating said standard deviation by interpolating between said lower and upper threshold as a value divided by the square root of two corresponding to a threshold percentage of the number of absolute values of said differences that do not exceed said maximum standard deviation. In one embodiment, the threshold percentage is 68%. In one embodiment, the lower and upper thresholds and said maximum standard deviation are determined based on a bit-depth and of a size of the image. In one embodiment, the method further comprises limiting the countings to a maximum value. In one embodiment, the method further comprises the step of establishing the lower threshold $\sigma_0$ and the upper threshold $\sigma_1$ for the successive block to be processed such that the value corresponding to the threshold percentage is a mean value between the wer and upper thresholds. In one embodiment, the method further comprises receiving the digital image from a color filter array circuit for Bayer images. In one embodiment, the method further comprising filtering white Gaussian noise from the image based on the determined standard deviations of noise for the blocks of the image.

In one embodiment, a computer-readable memory medium stores instructions for causing a processor to perform a method, the method comprising: dividing a digital image into a plurality of blocks; selecting a threshold control value for a block in the plurality of blocks; comparing intensities of pixels in the block to the threshold control value; selecting a set of pixels in the block based on the comparison; and determining a standard deviation of noise for the block based on the set of selected pixels. In one embodiment, selecting the threshold control value for the block in the plurality of blocks comprises setting the threshold control value equal to a threshold control value of a previous block. In one embodiment, the method further comprises setting a threshold control value for a successive block equal to the determined standard deviation for the block multiplied by a square root of 2. In one embodiment, determining the standard deviation of noise for the block based on the set of selected pixels comprises: comparing absolute values of differences of the intensities of pixels in the selected set of pixels and the threshold control value for the block with a lower threshold and an upper threshold; counting a number of absolute values of the differences that are below the lower threshold; counting a number of absolute values of the differences that are below the upper threshold; and counting a number of absolute values of the differences that are below the threshold control value.

In one embodiment, a system for processing digital images, the system comprises: means for selecting pixels in a block of pixels; means for generating an indication of a noise level of a block in an image based on the selected pixels in the block; means for generating a filter control signal coupled to the means for generating an indication of the noise level of the block; and means for filtering the image coupled to the means for generating the filter control signal. In one embodiment, the means for generating the filter control signal is configured to provide a feedback signal to the means for generating an indication of the noise level of the block. In one embodiment, the indication of the noise level is an estimated standard deviation of noise for the block. In one embodiment, the system further comprises a sensor coupled to the means for selecting pixels and the means for filtering the image.

In one embodiment, an image processor comprises: a noise statistics collector configured to compare pixels in a block of pixels in a digital image to a threshold control value, to select pixels in the block of pixels based on the comparison and to generate an indication of a noise level of the block based on the selected pixels; a control signal generator coupled to the noise statistics collector and configured to generate a filter control signal; and a filter coupled to the control signal generator. In one embodiment, the control signal generator is further configured to provide a feedback signal to the noise statistics collector. In one embodiment, the noise statistics collector is configured to adjust the threshold control value based on the feedback signal.

Embodiments of the methods described herein may be implemented with a software program executed by a computer or a microprocessor, or in a hardware device of this invention.

BRIEF DESCRIPTION OF THE SEVERAL VIEWS OF THE DRAWINGS

The invention is described referring to the attached drawings, wherein.

DETAILED DESCRIPTION

The noise level of an image depends on the characteristics of the sensor and on the light condition.

It may be reasonably assumed that the image cannot contain an arbitrarily high noise level. For this reason, according to an embodiment of a method of this invention the image is subdivided in blocks and it is assumed for the first block that the standard deviation of the differences between pixels due to noise could not exceed a maximum value $\sigma_{max}$.

This value can be established a priori or may be estimated in a preliminary phase in which the characteristics of the sensor are estimated in different lightening conditions.

Because of the wide diffusion of Bayer image sensors, solely by way of an example, hereinafter reference will be made to this type of images only, but what will be stated may be applied also for gray scale images or for color images with a different basic color pixel organization.

Figures 1, 3:
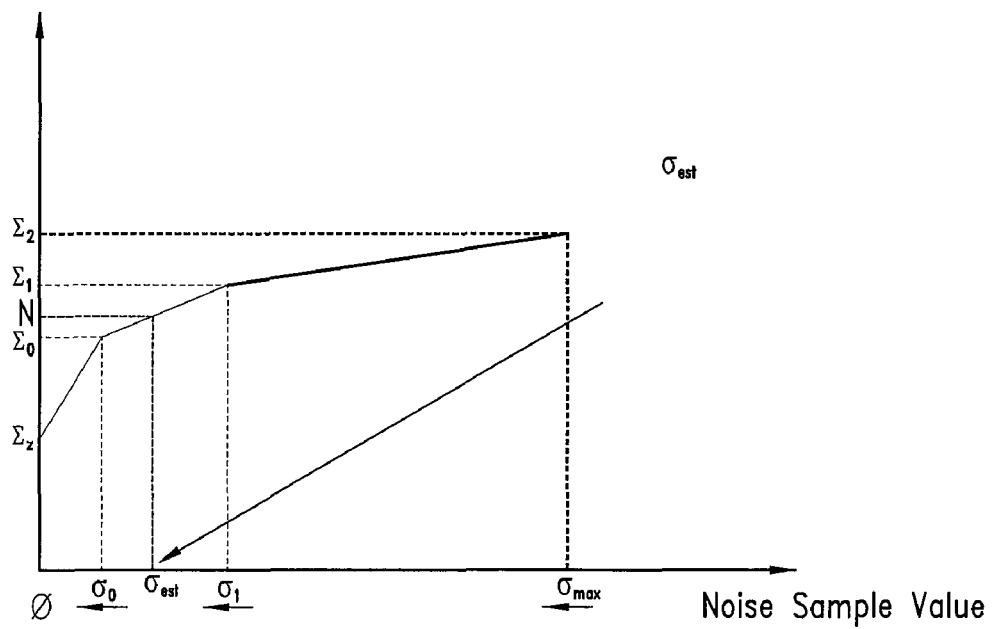
FIG. 1 depicts three working windows for the processing of a Bayer image.
FIG. 3 illustrates how to estimate the standard deviation of the white Gaussian noise according to a second embodiment of a method of this invention.

A Color Filter Array (CFA) of a Bayer image provides three images: green, red and blue. According to an embodiment of a method of this invention, these three images are subdivided in blocks and for each pixel to be filtered a working window centered thereon is used. FIG. 1 shows three working windows for the three images: green, red and blue generated by a CFA.

In the example of FIG. 1, reference has been made to a 5×5 working window, such that the window contains other pixels of the same color of the central pixel. Any skilled person will immediately recognize that for gray scale images it is possible to select a 3×3 working window or larger. Generally, the working window should contain at least a pixel of the same type (homologous) of the central pixel.

The absolute values of the differences $\delta_0, \delta_1, \ldots, \delta_7$ between the central pixel $P_C$ and the neighboring pixels of the same color are calculated:

$$\delta_i = |P_c - P_i|, i = 0, \ldots, 7$$

If $\delta_i \in [0, 3\sigma_{max}]$ for any $i = 0, \ldots 7$, then according to an embodiment of the method of this invention, it is assumed that the pixels of the working window belong to a homogeneous portion of the image.

The upper bound of $\delta_i$ is determined in function of $\sigma_{max}$ and may also differ from $3\sigma_{max}$.

The absolute values of the calculated differences $\sigma_i$ are stored in various registers, such to form a noise histogram. Let $\gamma_j$ be the absolute value of the $j^{th}$ difference $\delta_j$, being $j \in [0, \ldots, 7]$: if the absolute value of the $j^{th}$ difference is smaller than three times the maximum standard deviation, then the register T that stores the corresponding value is incremented by one:

$$\Psi(\gamma_j) = \Psi(\gamma_j) + 1.$$

Once all pixels of the considered block have been processed, the histogram of the absolute values of the differences stored in the registers will have a Gaussian distribution. The histogram has only positive values, but this does not complicate calculations of the standard deviation for a normal distribution because it is symmetrical on its mean value, that has been supposed null because it has been assumed that additive Gaussian noise has a zero mean. Then the standard deviation is calculated in function of the stored absolute values.

Figure 2:
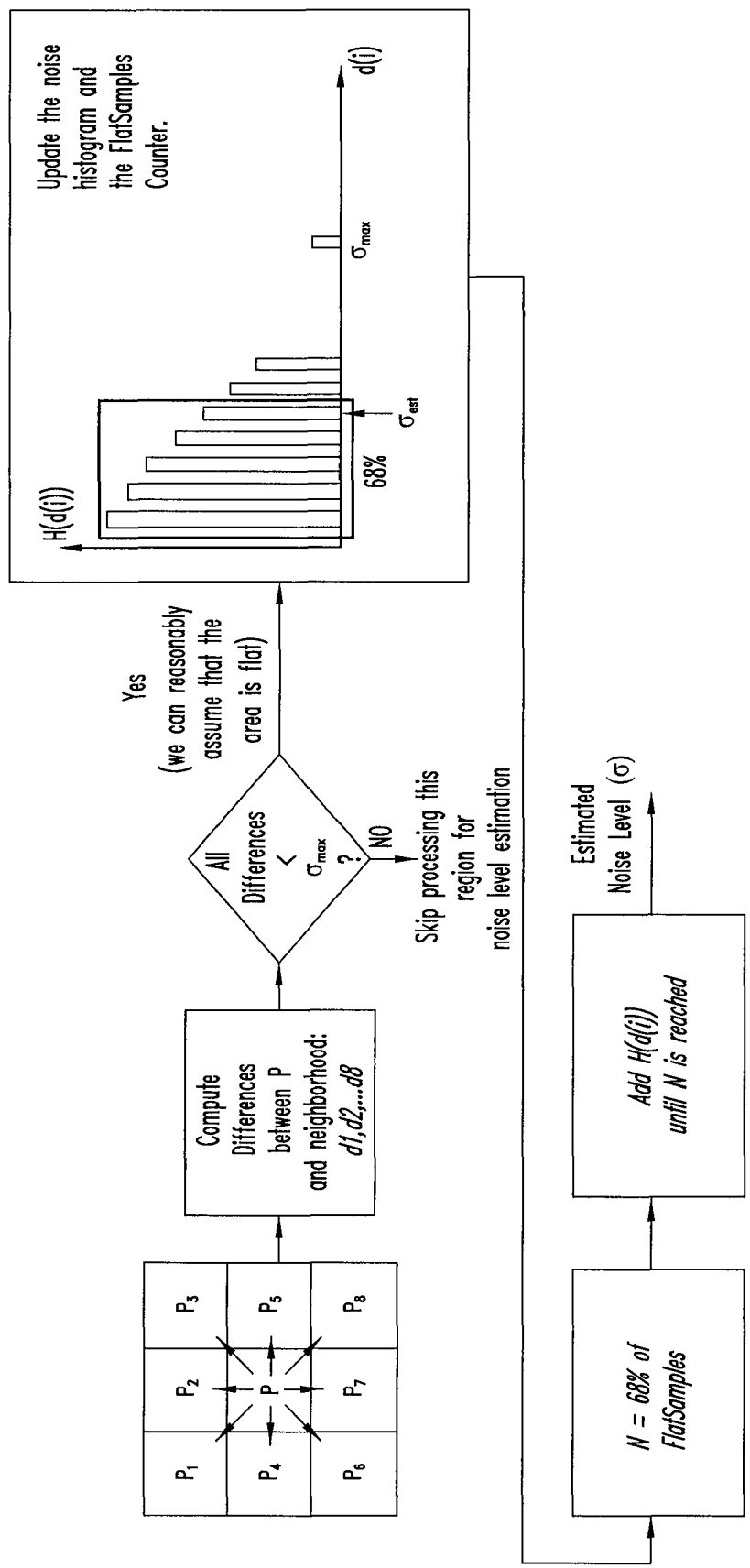
FIG. 2 shows a first embodiment of a method of this invention.

A simple way of doing it comes from the fact that in a Gaussian distribution about 68% of the samples is comprised in the range $[\mu-\sigma, \mu-\sigma]$. According to an embodiment, the standard deviation of the noise of the considered block is the value larger than 68% of the values of the previously obtained histogram. This embodiment is depicted in the scheme of FIG. 2.

This solution depends on the chosen maximum value for the standard deviation $\sigma_{max}$: this value should be carefully chosen, for example by testing the characteristics of the image sensor for different lightening conditions and by determining the situations for which the maximum noise is generated. With this technique it is possible to estimate an upper bound for the standard deviation $\sigma_{max}$.

Nevertheless, the probability that noise corrupting the image to be filtered is larger than the initially estimated level is not null. This problem can be addressed by fixing a sufficiently large expected maximum value for the standard deviation $\sigma_{max}$.

The above illustrated method can be further improved in an embodiment by modifying iteratively the maximum value of the standard deviation $\sigma_{max}$ from a block to the next of the image or sequence of images to be processed. With this expedient, the expected maximum value of the standard deviation $\sigma_{max}$ can be reduced for the next block if it is overestimated for the current block. This allows to reduce the number of absolute values of the differences to be stored and would make simpler and faster the algorithm.

To this end, the following steps are carried out:

an arbitrary value for the maximum value of the standard deviation for the first block to be analyzed is fixed;

the standard deviation of noise that corrupts the current block is estimated and in function of this value the maximum value for the standard deviation $\sigma_{max}$ is determined for the next block to be analyzed.

Preferably, the blocks belonging to a same image are processed by using a same value $\sigma_{max}$. As a consequence, if an image sequence is being processed, the value of $\sigma_{max}$ could be updated only when the current image has been processed and a next image is considered.

With this technique, it is not necessary to determine preliminarily the characteristics of the image sensor.

The value of $\sigma_{max}$ that fixes the maximum admissible noise level depends also on the "bit dept" of the input noisy image: if the input data are in a 8 bpp (bit per pixel) format, then the intensity of each pixel is in the interval from 0 to 255; if the data format is 10 bpp, then the intensity of each pixel is in the interval from 0 to 1023 and soon.

It is supposed that small variations of the pixel intensity are due to noise, but the attribute "small" is tied to the number of bit per pixel. When data are processed in a 8 bpp format, it may be reasonable to assume for example that in a very noisy image $\sigma_{max}=10$. Therefore, in this example the histogram of the absolute values of the differences would contain $3\sigma_{max}=30$ registers. If the data format is 10 bpp, multiply by four the number of registers (30), thus the noise histogram may be realized with 120 registers.

A sample table of the maximum values of the standard deviation is given hereinbelow:

| Bit depth | Data range | $3 \cdot \sigma_{max}$ |
|---|---|---|
| 8 | 0 ... 255 | 30 |
| 10 | 0 ... 1023 | 120 |
| 12 | 0 ... 4095 | 480 |
| 14 | 0 ... 16383 | 1920 |
| 16 | 0 ... 65535 | 7680 |
| 18 | 0 ... 262143 | 30720 |

The size of the histogram of the absolute values of the differences increases with the number of bits per pixels of the input image.

The value of the comparison threshold $3 \cdot \sigma_{max}$, or of any other threshold value determined in function of the maximum value of the standard deviation of noise, establishes the number of levels of absolute values of the differences to be stored and thus of the hardware registers used for counting the number of occurrences of each absolute value. Of course, the number of registers may be relatively large if the image to be processed is defined with a large number of bits per pixel.

According to an embodiment of the method of this invention, it is possible to calculate the standard deviation of noise by using a reduced number of registers, independently from the number of bits per pixels of the image to be processed.

To this end, a lower threshold $\sigma_0$ and an upper threshold $\sigma_1$ are established and the absolute values of the differences are compared with these two thresholds. Then in a first register the number $\Sigma_0$ of absolute values of the differences smaller than the lower threshold $\sigma_0$ is stored in a first register, the number $\Sigma_1$ of absolute values smaller than the upper threshold $\sigma_1$ is stored in a second register and the number $\Sigma_2$ of absolute values smaller than the threshold $\sigma_{max}$ is stored in a third register. By choosing the lower threshold $\sigma_0$ and the upper threshold $\sigma_1$ such that they are respectively smaller and larger of the standard deviation of the absolute values of the differences between pixels due to noise that corrupts the image to be processed, the number of absolute values of the differences smaller than the lower threshold $\sigma_0$ will be smaller than 68% and the number of absolute values of the differences smaller than the upper threshold $\sigma_1$ will be larger than 68% of the total number of absolute values smaller than $\sigma_{max}$. As a consequence, as schematically depicted in FIG. 3, it is possible to estimate the standard deviation of the absolute values of the differences by linear or quadratic interpolation or with any other type of interpolation between the lower threshold $\sigma_0$ and the upper threshold $\sigma_1$ as the value corresponding to 68% of the total number of calculated absolute values.

In an embodiment, the value of the upper threshold $\sigma_1$ is equal to the value of the maximum standard deviation $\sigma_{max}$.

According to a further embodiment of this invention, four threshold are established: $\sigma_z$, $\sigma_0$, $\sigma_1$, $\sigma_{max}$.

Differently from the previous case, in this case there an additional threshold $\sigma_z$ smaller than the threshold $\sigma_0$. The number $\Sigma_z$ of absolute values smaller than or equal to the threshold $\sigma_z$ may be used for improving the estimation of the standard deviation of the absolute values of the differences.

In an embodiment it is $\sigma_z=0$.

An example of how the thresholds $\sigma_0$, $\sigma_1$ and $\sigma_{max}$ can be chosen is shown in the following table (supposing $\sigma_z=0$):

| BitDepth | $\sigma_0$ | $\sigma_1$ | $\sigma_{max}$ |
|---|---|---|---|
| 8 | 5 | 10 | 30 |
| 10 | 20 | 40 | 120 |
| 12 | 80 | 160 | 480 |
| 14 | 320 | 640 | 1920 |
| 16 | 1280 | 2560 | 7680 |
| 18 | 5120 | 10240 | 30720 |

Being N=68% of the total number of absolute values of calculated differences. Four different cases are possible:

$0 < N \leq \Sigma_z$ $\Sigma_z < N \leq \Sigma_0$ $\Sigma_0 < N \leq \Sigma_1$ $\Sigma_1 < N \leq \Sigma_2$ The thresholds $\sigma_0$, $\sigma_1$, $\sigma_{max}$ may be determined in a dynamic fashion, that is their values may be updated for a block to be processed in function of the estimated standard deviation of the just processed block. These thresholds may be fixed such that the estimated value $\sigma_{est}$ of the standard deviation of the absolute values of the differences is the mean between the thresholds $\sigma_0$ and $\sigma_1$, and the value $\sigma_{max}$ is a multiple of $\sigma_1$, that is:

$$\begin{cases} \sigma_0 = \sigma_{est} - \delta; \\ \sigma_1 = \sigma_{est} + \delta; \\ \sigma_{max} = (\sigma_{est} + \delta) \cdot \Omega \end{cases}$$

wherein $\delta \in N$ is used for expanding the interval centered in $\sigma_{est}$ and influences the convergence speed of the method of this invention. Typical values that mat be used in the above equations are:

$\delta=2; \Omega=3$

By adjusting the factor $\delta$ the convergence speed is modified. This is particularly useful when the number of bits per pixels is relatively large (that is larger than 8) and it is noticed an intolerable delay in the convergence of the method. Clearly, different values of $\delta$ will produce different delays.

Typically, for images defined with 8 bits per pixel, the value of $\sigma_{est}$ may be 5.

The new values for $\sigma_0$ and $\sigma_1$ will be used for estimating the noise level relative to the next block, that may be a block of the same image or a block of a successive image in a image sequence.

As already said, the standard deviation may be estimated by using a linear interpolator:

$$\begin{cases} \sigma_{est} = 0, & 0 < N \leq \Sigma_Z \\ \sigma_{est} = \dfrac{\sigma_0(N - \Sigma_Z)}{(\Sigma_0 - \Sigma_Z)}, & \Sigma_Z < N \leq \Sigma_0 \\ \sigma_{est} = \dfrac{(\sigma_1 - \sigma_0)(N - \Sigma_0)}{(\Sigma_1 - \Sigma_0)} + \sigma_0, & \Sigma_0 < N \leq \Sigma_1 \\ \sigma_{est} = \dfrac{(\sigma_2 - \sigma_1)(N - \Sigma_1)}{(\Sigma_2 - \Sigma_1)} + \sigma_1, & \Sigma_1 < N \leq \Sigma_2 \end{cases}$$

Dividing the calculated value $\sigma_{est}$ by the square root of 2, the noise level estimated for the current block is obtained:

$$\Phi_\sigma = \frac{1}{\sqrt{2}} \sigma_{est}$$

As already said, the value of $\Phi_\sigma$ may be conveniently used for estimating the noise level of the next image block.

It is to be noted that the value $\sigma_{est}$ is divided by $\sqrt{2}$. Being $P_i$ the current pixel, its value is given by the following equation:

$$P_i = S_i + \eta_i$$

wherein:

$P_i$: current pixel;
$S_i$: value of the current pixel non corrupted by noise (ideal);
$\eta_i$: noise value in the point $P_i$ (it is a noise $N(0, \sigma^2)$).

By calculating the difference between the pixel $P_i$ and the central pixel $P_c$, $$P_i - P_c = S_i + \eta_i - (S_c + \eta_c) = S_i - S_c + \eta_i - \eta_c$$

If the pixels $P_i$ and $P_c$ belong to a homogeneous area, then $S_i = S_c$, thus:

$$P_i - P_c = \eta_i - \eta_c$$

Given two normally distributed stochastic variable X and Y, their sum has a probability density function given by:

$$P_{X+Y}(u) = \frac{1}{\sqrt{2\pi(\sigma_X^2 + \sigma_Y^2)}} e^{-\frac{[u - (\mu_X + \mu_Y)]^2}{2(\sigma_X^2 + \sigma_Y^2)}}$$

wherein the mean value is $\mu_{X+Y} = \mu_X + \mu_Y$ and the variance is $\sigma_{X+Y}^2 = \sigma_X^2 + \sigma_Y^2$.

In case of zero mean AWGN, $\sigma_{X+Y}^2 = \sigma_X^2 + \sigma_Y^2$ and thus $\mu_{\eta_i - \eta_c} = 0$.

Supposing that the pixels $P_i$ and $P_c$ are corrupted by the same type of noise, then $\sigma_{\eta_i}^2 = \sigma_{\eta_c}^2$, thus the random variable $\eta_i - \eta_c$ has a distribution $N(0, 2\sigma^2)$.

By hypothesis, the stochastic variables $\eta_i$ and $\eta_c$ are independent, then their covariance is null and the variance of their difference is the sum of the variances of the stochastic variables, thus:

$$Var(\eta_i - \eta_c) = 2\sigma^2.$$

The estimated value $\sigma_{est}$ is $\sqrt{2}$ times larger than the noise standard deviation, thus the output of the linear interpolator is multiplied by 0.7071.

It is to be noticed that the hypothesis of zero mean noise is not essential: any skilled person would immediately recognize that even if the stochastic variables $\eta_i$ and $\eta_c$ had zero mean, the noise standard deviation could be estimated as illustrated above because $\mu_{\eta_i - \eta_c} = 0$.

Another important consideration when the noise standard deviation is to be calculated consists in preventing overflows.

More particularly, there are five main parameters that play an important role to this objective:

i) the values of $\sigma_0$, $\sigma_1$, $\sigma_{max}$;
ii) the number of bits per pixel (bpp);
iii) the size of the image (width×height).

The values of $\sigma_0$, $\sigma_1$, $\sigma_{max}$, are multiplied by four for each two more bits for defining each pixel, as shown in the two previous tables. When the number of bits per pixels is relatively large (that is bpp>8), it is possible to have an overflow in any of the following multiplications:

$$\sigma N, (\sigma_1 - \sigma_0)(N - \Sigma_0), (\sigma_2 - \sigma_1)(N - \Sigma_1).$$

Therefore, also the registers dedicated for storing countings should be managed for preventing overflows.

According to an embodiment, variables used for carrying out the above multiplications are limited up to $2^{16}$: with this expedient, the above multiplications will not produce overflows. Depending on the size of the available registers, it is possible to have a different precision, as schematically shown in the following equations:

$$\text{if } (\Sigma_Z > 2^{Precision}) \Sigma_Z = 2^{Precision}$$

$$\text{if } (\Sigma_2 > 2^{Precision}) \Sigma_2 = 2^{Precision}$$

$$\text{if } (\Sigma_0 > 2^{Precision}) \Sigma_0 = 2^{Precision}$$

$$\text{if } (\Sigma_1 > 2^{Precision}) \Sigma_1 = 2^{Precision}$$

wherein Precision may be 16, but can even be a different value.

Figure 4:
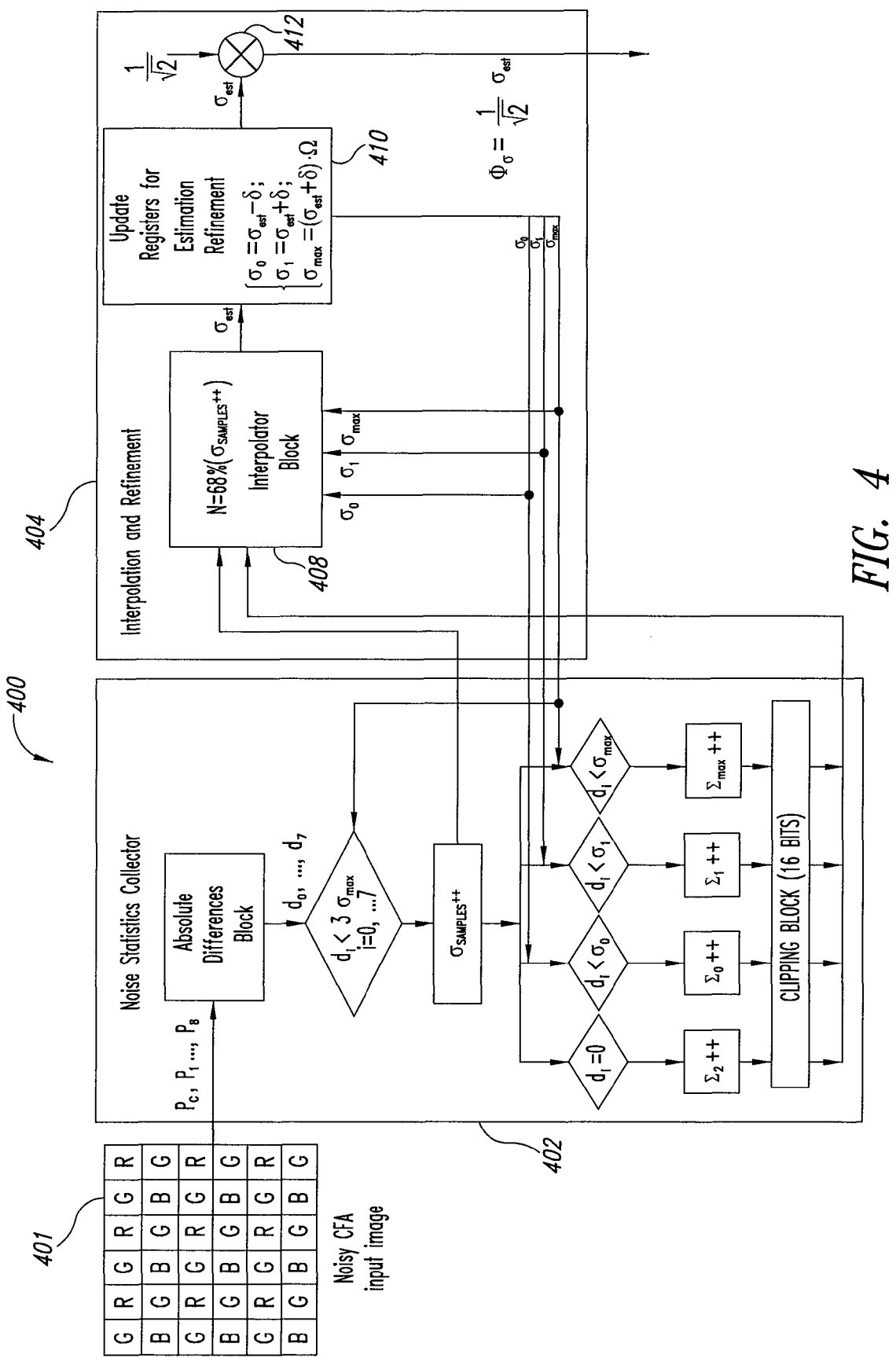
FIG. 4 illustrates a basic scheme of a device of an embodiment for carrying out an embodiment of a method of this invention.

FIG. 4 depicts a basic diagram of a system 400 that implements an embodiment of the method described herein. The system 400 comprises one or more sensors 401 providing an image. The system 400 also comprises:

i) a portion that works at a pixel level NOISE STATISTICS COLLECTOR 402;
ii) a portion that works at block or image level INTERPOLATION AND REFINEMENT MODULE 404.

For each pixel, the set of absolute values of the differences is calculated by using the ABSOLUTE DIFFERENCES BLOCK 406. The set of absolute values of the differences is analyzed for determining whether all the differences are smaller than $3\sigma_{max}$. If all absolute values of the differences are smaller than $3\sigma_{max}$, the number of valid samples is increased and the corresponding registers are updated.

A clipping operation that consists in preventing overflows, as explained above, can be carried out if the content of registers exceeds a maximum established value.

After having processed the whole block or also the whole image by using the above described technique, the content of registers is analyzed. They may be provided to the circuit INTERPOLATOR BLOCK 408 that calculates the number N that corresponds to 68% of the total number of samples and, by using the interpolation equations, calculates the value $\sigma_{est}$. The value $\sigma_{est}$ is provided by the UPDATE REGISTER BLOCK 410 that calculates new values $\sigma_0$, $\sigma_1$, $\sigma_{max}$ for the next block (or image). The estimated noise value $\sigma_{est}$ is then multiplied by $1/\sqrt{2}$ by multiplier 412.

Figure 5:
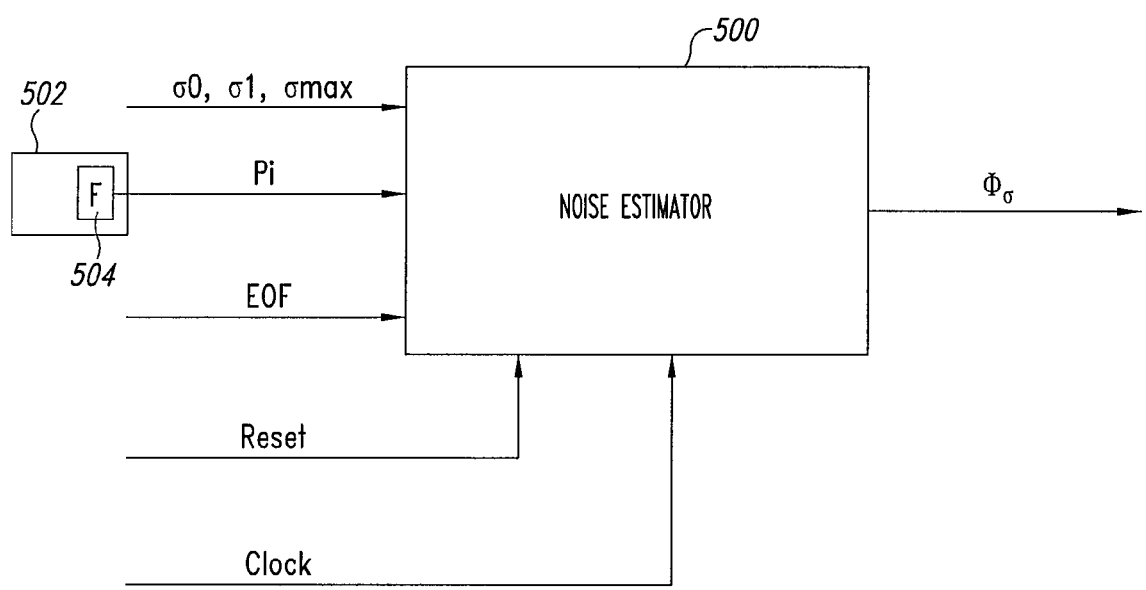
FIG. 5 is a functional block diagram of the device of FIG. 4.

Substantially, the embodiment depicted in FIG. 4 can be represented as functional blocks as shown in FIG. 5. A noise estimator 500 is input with the following values:

1) $\sigma_0$, $\sigma_1$, $\sigma_{max}$;
2) the values of the pixels $P_i$ provided by the sensor 502 (in case of a Bayer image, they will be the pixel values output by a filter mask 504);
3) EOF: signal that flags the end of the block (or of the image);
4) RESET: it is a resetting signal;
5) CLOCK: it is a timing signal.

The output signal represents the value $\Phi_\sigma$, that represents the estimated noise level (standard deviation) associated to the current block (or image).

Figure 6:
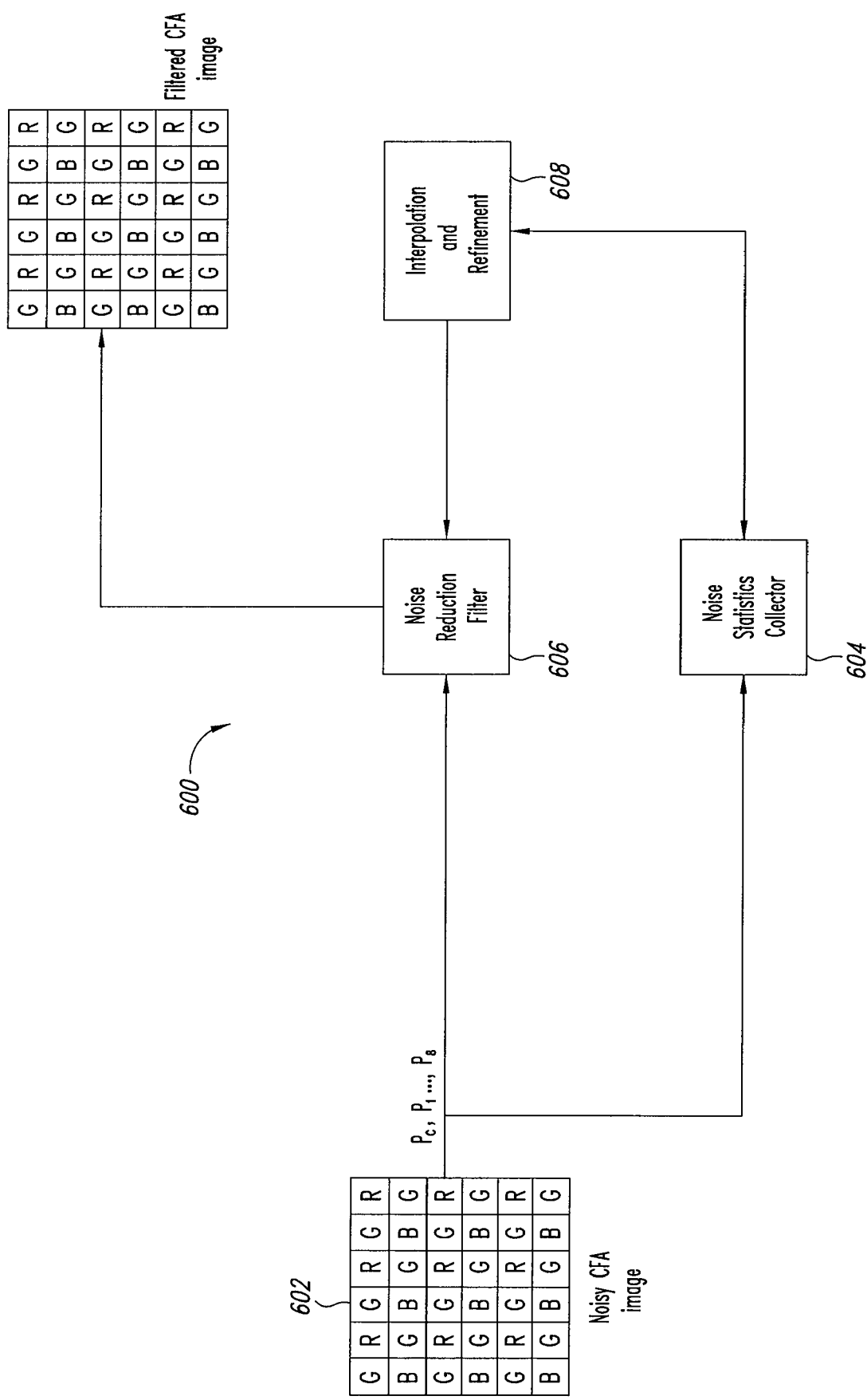
FIG. 6 shows an embodiment suitable for use with a sensor that operates in "live preview" mode.

FIG. 6 depicts a functional block diagram of a system 600 of an embodiment suitable for filtering a noisy image, that in the depicted example is a Bayer image.

The system 600 analyzes data acquired by the sensor 602 in "live preview" mode, a NOISE STATISTICS COLLECTOR 604 provides an indication of a noise level such as the standard deviation of noise that corrupts the current image to a module for reducing noise NOISE REDUCTION FILTER 606, that on its turn generates a filtered image using the estimated noise level. An interpolation and refinement module or circuit 608 is configured to calculate $\sigma_{est}$ and update $\sigma_z$, $\sigma_0$, $\sigma_1$, $\sigma_2$, and may provide feedback, such as the calculated estimate, to the noise statistics collector 604

The function of each circuit or module and the meaning of the signals mentioned in FIG. 6 is resumed in the following table:

| | |
|---|---|
| NOISE STATISTICS COLLECTOR 604 | Updates the variables $\Sigma_z$, $\Sigma_0$, $\Sigma_1$, $\Sigma_2$ |
| NOISE REDUCTION FILTER 606 | Noise reduction filter that uses the estimation $\sigma_{est}$ |
| INTERPOLATION AND REFINEMENT 608 | Circuit or module that calculates $\sigma_{est}$ and updates $\sigma_z$, $\sigma_0$, $\sigma_1$, $\sigma_2$ |

Figure 7:
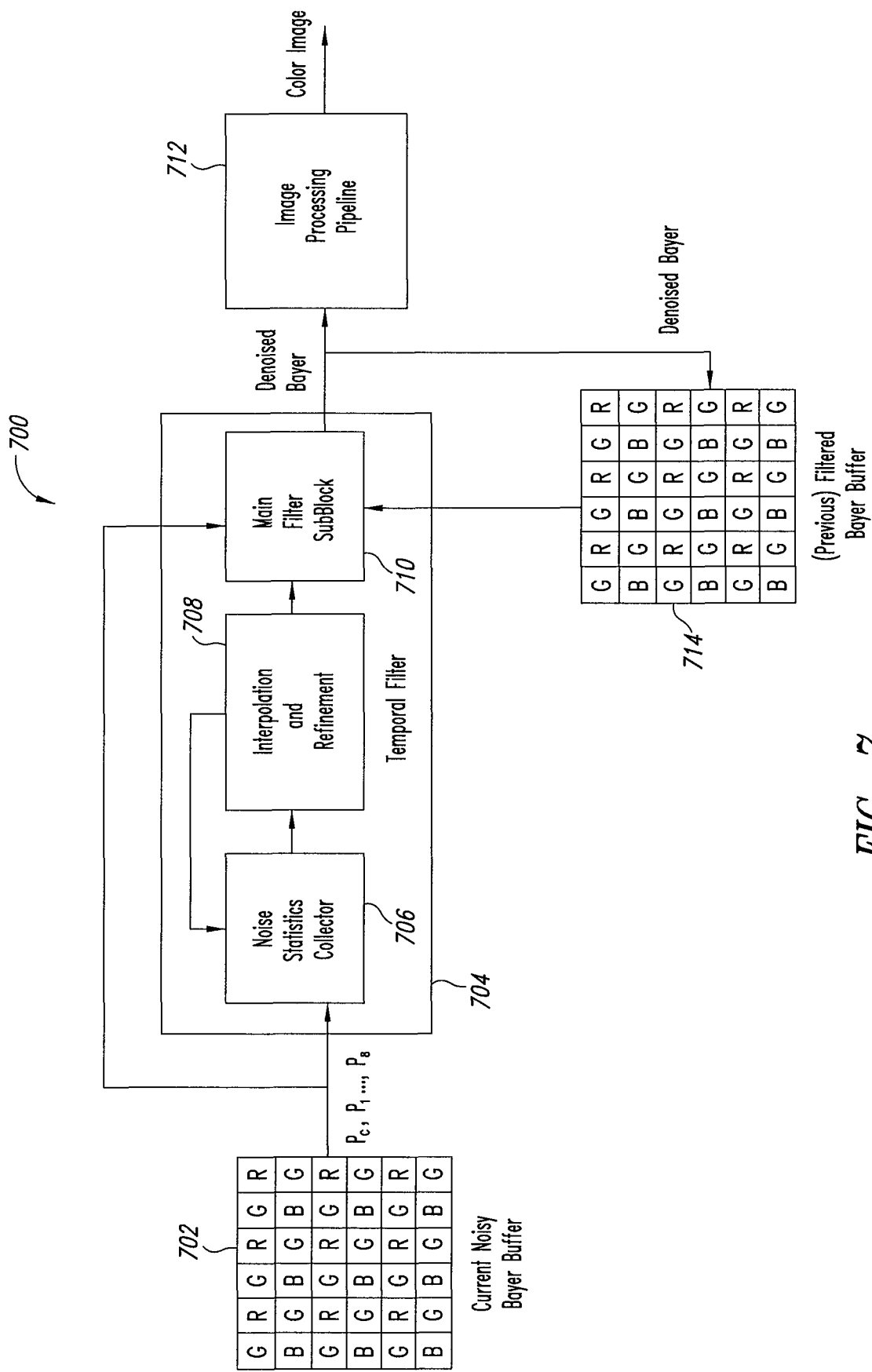
FIG. 7 depicts an embodiment of an image processing system including a time filter.

Another possible embodiment is depicted in FIG. 7. The system 700 of FIG. 7 is similar to the system 600 of FIG. 6, in that similar modules or circuits are configured to perform similar functions. In practice, embodiments, such as the embodiment depicted in FIG. 4, may be part of a temporal filter TEMPORAL FILTER. This is illustrated in FIG. 7. The system 700 comprises a buffer 702 configured to provide a noisy image to a temporal filter 704. The temporal filter 704 comprises a noise statistics collector 706, an interpolation and refinement module 708 and a main filter sub-block 710. Each block of data is provided to the NOISE STATISTICS COLLECTOR 706 and the INTERPOLATION AND REFINEMENT module 708 such that the noise level is continuously updated block by block or even image by image. The noise level of each image is estimated and is used for setting the filtering characteristics of the filter MAIN FILTER SUB-BLOCK 710, that outputs a noise filtered image (that in the depicted example is a Bayer image). Therefore, the filtered image DENOISED BAYER is processed by a pipeline IMAGE PROCESSING PIPELINE 712 that may interpolate the values of the missing pixels for generating a color image. The filter image may also be stored in a buffer 714 and provided to the main filter sub-block 710, where it may be used to set filter characteristics for a subsequent image.

The advantages of embodiments of the methods described herein may include:

a reduced number of calculations, because only differences are calculated and only linear interpolation equations are used;

a memory reduction, because according to an embodiment only four registers are used and the number of bits of each register may be defined according to user's needs;

the method may be configured to be self-adapting to eventual noise fluctuations from an image to the next in an image sequence;

the method converges toward conditions that allow a simpler and more accurate evaluation of the noise level that corrupts the image, that is when the estimated standard deviation $\sigma_{est}$ is the mean value of $\sigma_0$ and $\sigma_1$;

embodiments may be used in different environments and may be coupled to or comprise temporal filters, spatial filters, filters for correcting artifacts and so on.

Embodiments of the systems and methods described herein may be implemented in a variety of ways, including as a combined system or as separate subsystems. Embodiments may be implemented as discrete circuitry, one or more microprocessors, digital signal processors (DSP), application-specific integrated circuits (ASIC), or the like, or as a series of instructions stored in a memory and executed by a controller, or various combinations of the above. In some embodiments, separately described sub-modules may be combined.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of automatically estimating white Gaussian noise that corrupts a digital image, comprising the steps of:
    a) subdividing the image to be processed in blocks;
    b) determining a maximum standard deviation of absolute values of differences among pixels of a block;
    c) for each pixel of the block, performing the steps of:
        c1) calculating absolute values of differences of intensities between the pixel and homogeneous pixels contained in a working window centered on the pixel;
        c2) comparing the absolute values of differences with a threshold based on the maximum standard deviation of the block; and
        c3) classifying the pixel as belonging to a homogeneous portion of the image if the absolute values of the differences are all smaller than the threshold;
    d) determining a standard deviation of noise for the block based on pixels classified as belonging to homogeneous portions of the image, wherein pixels which are not classified as homogeneous are not considered in determining the standard deviation of noise for the block; and
    e) setting a maximum standard deviation of differences between pixels for a successive block to be processed and repeating steps c) through d) for the successive block.

2. A method of automatically estimating white Gaussian noise that corrupts a digital image, comprising the steps of:

a) subdividing the image to be processed in blocks;
b) determining a maximum standard deviation of absolute values of differences among pixels of a block;
c) for each pixel of the block, performing the steps of:
   c1) calculating absolute values of differences of intensities between the pixel and homogeneous pixels contained in a working window centered on the pixel;
   c2) comparing the absolute values of differences with a threshold based on the maximum standard deviation of the block; and
   c3) classifying the pixel as belonging to a homogeneous portion of the image if the absolute values of the differences are all smaller than the threshold;
d) determining a standard deviation of noise for the block based on pixels classified as belonging to homogenous portions of the image; and
e) setting a maximum standard deviation of differences between pixels for a successive block to be processed and repeating steps c) through d) for the successive block, wherein setting the maximum standard deviation of the successive block to be processed comprises setting the maximum standard deviation for the successive block equal to the maximum standard deviation of the previous block.

3. The method of claim 1, wherein setting the maximum standard deviation for the successive block to be processed comprises multiplying the standard deviation established at point d) for the previous block by a square root of 2.

4. The method according to claim 1, wherein step d) comprises:
   d1) storing the absolute values of the differences in respect to the pixel; and
   d2) estimating the noise standard deviation on the block as a standard deviation of the stored absolute values divided by a square root of two.

5. The method according to claim 1, wherein said step d) comprises:
   d1) establishing at least a lower threshold $\sigma_0$ and an upper threshold $\sigma_1$;
   d2) comparing the absolute value of each of said differences with the lower threshold $\sigma_0$ and the upper threshold $\sigma_1$;
   d3) counting a number of absolute values of said differences that do not exceed said lower threshold;
   d4) counting a number of absolute values of said differences that do not exceed said upper threshold;
   d5) counting a number of absolute values of said differences that do not exceed said maximum standard deviation; and
   d6) estimating said standard deviation by interpolating between said lower and upper threshold as a value divided by the square root of two corresponding to a threshold percentage of the number of absolute values of said differences that do not exceed said maximum standard deviation.

6. The method of claim 5, wherein said threshold percentage is 68%.

7. The method of claim 5, wherein said lower and upper thresholds and said maximum standard deviation are determined based on a bit-depth and of a size of the image.

8. The method of claim 5, further comprising the step of limiting the countings carried out at steps d3), d4) and d5) to a maximum value.

9. The method of claim 5, comprising the step of establishing the lower threshold $\sigma_0$ and the upper threshold $\sigma_1$ for the successive block to be processed such that the value corresponding to the threshold percentage is a mean value between the lower and upper thresholds.

10. The method of claim 1, further comprising receiving the digital image from a color filter array circuit for Bayer images.

11. The method of claim 1, further comprising filtering white Gaussian noise from the image based on the determined standard deviations of noise for the blocks of the image.

12. A non-transitory computer-readable memory medium storing instructions for causing a processor to perform a method, the method comprising:
   dividing a digital image into a plurality of blocks; and
   for each block of the digital image,
      selecting a threshold control value for the block in the plurality of blocks;
      comparing intensities of pixels in the block to the threshold control value;
      selecting a set of pixels in the block based on the comparison; and
      determining a standard deviation of noise for the block based on the set of selected pixels, without considering pixels excluded from the set of selected pixels, the determining the standard deviation of noise for the block including:
         comparing absolute values of differences of the intensities of pixels in the selected set of pixels and the threshold control value for the block with a lower threshold and an upper threshold;
         counting a number of absolute values of the differences that are below the lower threshold;
         counting a number of absolute values of the differences that are below the upper threshold; and
         counting a number of absolute values differences that are below the threshold control value.

13. The non-transitory computer-readable memory medium of claim 12 wherein selecting the threshold control value for the block in the plurality of blocks comprises setting the threshold control value equal to a threshold control value of a previous block.

14. A non-transitory computer-readable memory medium storing instructions for causing a processor to perform a method, the method comprising:
   dividing a digital image into a plurality of blocks;
   for each block of the digital image,
      selecting a threshold control value for the block in the plurality of blocks;
      comparing intensities of pixels in the block to the threshold control value;
      selecting a set of pixels in the block based on the comparison;
      determining a standard deviation of noise for the block based on the set of selected pixels, without considering pixels excluded from the set of selected pixels; and
      setting a threshold control value for a successive block equal to the determined standard deviation for the block multiplied by a square root of 2.

15. The non-transitory computer-readable memory medium of claim 14 wherein determining the standard deviation of noise for the block based on the set of selected pixels comprises:
   comparing absolute values of differences of the intensities of pixels in the selected set of pixels and the threshold control value for the block with a lower threshold and an upper threshold;
   counting a number of absolute values of the differences that are below the lower threshold;

counting a number of absolute values of the differences that are below the upper threshold; and counting a number of absolute values of the differences that are below the threshold control value.

16. A system for processing digital images, the system comprising:

means for dividing an image into a plurality of blocks of pixels;

means for selecting pixels in a block of pixels of the plurality based on intensity levels of the pixels in the block of pixels;

means for generating an indication of a noise level of the block in the image based on the selected pixels in the block, without considering pixels excluded from the selected pixels;

means for generating a filter control signal coupled to the means for generating an indication of the noise level of the block; and means for filtering the image coupled to the means for generating the filter control signal, wherein the means for generating the filter control signal is configured to provide a feedback signal to the means for generating an indication of the noise level of the block.

17. A system for processing digital images, the system comprising:

means for selecting pixels in a block of pixels based on intensity levels of the pixels in the block of pixels;

means for generating an indication of a noise level of a block in an image based on the selected pixels in the block;

means for generating a filter control signal coupled to the means for generating an indication of the noise level of the block; and means for filtering the image coupled to the means for generating the filter control signal, wherein the means for generating the filter control signal is configured to provide a feedback signal to the means for generating an indication of the noise level of the block.

18. The system of claim 16 wherein the indication of the noise level is an estimated standard deviation of noise for the block.

19. The system of claim 16, further comprising a sensor coupled to the means for selecting pixels and the means for filtering the image.

20. An image processor, comprising:

one or more processing devices configured to implement:

a noise statistics collector configured to compare pixels in a block of pixels in a digital image to a threshold noise control value, to select pixels in the block of pixels based on the comparison and to generate an indication of a noise level of the block based on the selected pixels, without considering non-selected pixels in the generation of the indication of the noise level of the block;

a control signal generator coupled to the noise statistics collector and configured to generate a filter control signal; and a filter coupled to the control signal generator, wherein the control signal generator is further configured to provide a feedback signal to the noise statistics collector.

21. An image processor, comprising:

one or more processing devices configured to implement:

a noise statistics collector configured to compare pixels in a block of pixels in a digital image to a threshold noise control value, to select pixels in the block of pixels based on the comparison and to generate an indication of a noise level of the block based on the selected pixels;

a control signal generator coupled to the noise statistics collector and configured to generate a filter control signal; and a filter coupled to the control signal generator, wherein the control signal generator is further configured to provide a feedback signal to the noise statistics collector.

22. The image processor of claim 21 wherein the noise statistics collector is configured to adjust the threshold noise control value based on the feedback signal.

23. The method according to claim 2 wherein step d) comprises:

d1) storing the absolute values of the differences in respect to the pixel; and d2) estimating the noise standard deviation on the block as a standard deviation of the stored absolute values divided by a square root of two.

24. The method according to claim 2 wherein said step d) comprises:

d1) establishing at least a lower threshold $\sigma_0$ and an upper threshold $\sigma_1$;

d2) comparing the absolute value of each of said differences with the lower threshold $\sigma_0$ and the upper threshold $\sigma_1$;

d3) counting a number of absolute values of said differences that do not exceed said lower threshold;

d4) counting a number of absolute values of said differences that do not exceed said upper threshold;

d5) counting a number of absolute values of said differences that do not exceed said maximum standard deviation; and d6) estimating said standard deviation by interpolating between said lower and upper threshold as a value divided by the square root of two corresponding to a threshold percentage of the number of absolute values of said differences that do not exceed said maximum standard deviation.

25. The system of claim 17 wherein the indication of the noise level is an estimated standard deviation of noise for the block.

26. The system of claim 17, further comprising a sensor coupled to the means for selecting pixels and the means for filtering the image.

* * * * *